US009300737B1

(12) United States Patent
Agsen et al.

(10) Patent No.: US 9,300,737 B1
(45) Date of Patent: Mar. 29, 2016

(54) OBJECT REPLICATION USING OBJECT DEVICE LINKS AND FLAGS

(71) Applicant: Mylio, LLC, Bellevue, WA (US)

(72) Inventors: Mohsen Agsen, Honolulu, HI (US); Deon Brewis, Redmond, WA (US); David de Regt, Bellevue, WA (US); Momin Al-Ghosien, Sammamish, WA (US); Jean Pierre Duplessis, Kirkland, WA (US); Craig Symonds, Woodinville, WA (US)

(73) Assignee: Mylio, LLC, Bellevue, WA (US)

( * ) Notice: Subject to any disclaimer, the term of this patent is extended or adjusted under 35 U.S.C. 154(b) by 0 days.

(21) Appl. No.: 14/747,955

(22) Filed: Jun. 23, 2015

Related U.S. Application Data

(60) Provisional application No. 62/169,994, filed on Jun. 2, 2015.

(51) Int. Cl.
*G06F 15/16* (2006.01)
*H04L 29/08* (2006.01)

(52) U.S. Cl.
CPC ........ *H04L 67/1095* (2013.01); *H04L 67/1097* (2013.01)

(58) Field of Classification Search
CPC ..... G06F 9/543; G06F 9/465; G06F 11/2082; H04L 12/5695; H04L 47/781; H04L 47/822
USPC .................. 709/217, 223–226, 228
See application file for complete search history.

(56) References Cited

U.S. PATENT DOCUMENTS

| 6,757,450 | B1 | 6/2004 | Gershony et al. |
| 8,533,258 | B2 | 9/2013 | Parker, III et al. |
| 8,750,574 | B2 | 6/2014 | Ganong et al. |
| 8,769,049 | B2 | 7/2014 | Murphy et al. |

(Continued)

OTHER PUBLICATIONS

Thorup, "Efficient Image Processing Using Dynamically Sized Tiles," U.S. Appl. No. 14/750,809, filed Jun. 25, 2015, 41 pages.

(Continued)

*Primary Examiner* — Hitesh Patel
(74) *Attorney, Agent, or Firm* — Seed IP Law Group PLLC

(57) ABSTRACT

Systems and methods for providing data replication and/or synchronization across multiple processor-based devices. Data objects (e.g., image files, video files, audio files) may exist in a plurality of forms (e.g., original, preview, thumbnail). The systems and methods utilize object device links (ODLs) and needs/has flags which are replicated to multiple processor-based devices to provide partial or full object replication between multiple processor-based devices. Some implementations provide complete replica backups of objects. Some implementations provide temporary protection of original forms of objects, for example, when a user is traveling. Some implementations provide for relaying and shuttling of objects across multiple devices via one or more networks and/or via peer-to-peer wired or wireless communications also allowing for offsite and remote location backup of objects. Some implementations provide support for container and individual object replication policies with inheritance. Some implementations can provide load balancing storage of objects. Some implementations can provide for efficient space management of objects on storage-constrained devices.

28 Claims, 12 Drawing Sheets

(56) References Cited

U.S. PATENT DOCUMENTS

| | | | |
|---|---|---|---|
| 9,031,920 B2* | 5/2015 | Soltani et al. | 707/694 |
| 2010/0268742 A1* | 10/2010 | Ring et al. | 707/792 |
| 2011/0047341 A1 | 2/2011 | Yu et al. | |
| 2012/0203932 A1 | 8/2012 | Da Costa et al. | |
| 2012/0320069 A1 | 12/2012 | Lee et al. | |
| 2013/0054524 A1* | 2/2013 | Anglin et al. | 707/624 |
| 2013/0063462 A1 | 3/2013 | Bloomfield et al. | |
| 2013/0190981 A1 | 7/2013 | Dolinar et al. | |
| 2014/0161326 A1 | 6/2014 | Ganong et al. | |
| 2014/0205207 A1 | 7/2014 | Bhatt | |
| 2015/0131898 A1 | 5/2015 | Schelten et al. | |

OTHER PUBLICATIONS

Thorup, "Efficient Image Processing Using Dynamically Sized Tiles," Notice of Allowance, mailed Sep. 8, 2015 for U.S. Appl. No. 14/750,809, 8 pages.

* cited by examiner

| MEDIA | D1_NeedsThumbs | D1_HasThumbs | D1_NeedsPreviews | ... | D1_NeedsOriginals | D1_HasOriginals | D2_NeedsThumbs | ... | D4_HasOriginals |
|---|---|---|---|---|---|---|---|---|---|
| PICTURE1 | YES | YES | YES | ⋮ | YES | YES | YES | ⋮ | YES |
| PICTURE2 | YES | YES | YES | ⋮ | YES | YES | YES | ⋮ | YES |
| ... | ... | ... | ... | ... | ... | ... | ... | ... | ... |

FIG. 6

OBJECT REPLICATION USING OBJECT DEVICE LINKS AND FLAGS

BACKGROUND

1. Technical Field

The present disclosure generally relates to replication and/or synchronization of data objects across multiple processor-based devices.

2. Description of the Related Art

End users often have data collections (e.g., photos, videos, music, documents) that are spread across multiple processor-based devices (e.g., phones, personal computers, laptops, gaming consoles, tablet devices, digital cameras, cloud storage, etc.) spanning multiple networks. As computing devices become more prevalent and widely used among the general population, the amount of data generated and utilized by such devices has rapidly increased.

Modern devices, while more powerful than ever, continue to be challenged in terms of their ability to store all of the information that users want on all of their various devices. For instance, digital photography has recently become extremely popular, and as a result, digital pictures may cause many devices to run into storage limits. Further, this storage problem is only getting worse because most portable devices are using more expensive and smaller storage solid-state memory devices, as opposed to magnetic storage devices.

Further, recent advancements in communication technology can enable computing devices to communicate data at a high rate of speed. These advancements have led to, among other technologies, the implementation of distributed computing services that can, for example, be conducted using computing devices at multiple locations on a network. In addition, such advancements have enabled the implementation of services such as network-based backup, which allow a user of a computing device to maintain one or more backup copies of data associated with the computing device at a remote location on a network.

Existing systems and/or data backup solutions enable a user to store backup information in a location and/or media separate from its original source. Thus, for example, data from a computing device can be backed up from a hard drive to external media such as a tape drive, an external hard drive, or the like. However, in an implementation of network-based backup and/or other solutions that can be utilized to provide physically remote locations for storing backup data, costs and complexity associated with transmission and restoration of user data between a user machine and a remote storage location can substantially limit the usefulness of a backup system. For example, in the case where backup data is stored at a remote network location, data associated with respective versions of an original copy of a file and/or system image can be transmitted to remote storage (e.g., cloud), where the respective versions can later be retrieved for restoration. However, storing all of a user's content in a remote storage can be prohibitively expensive (and bandwidth consuming) for content such as digital photos and videos.

Data replication is used to protect data from loss, to ensure continuity and to provide access to content on other devices (e.g., access to pictures taken on a mobile phone on a desktop computer) while keeping the total cost of ownership relatively low. Generally, data replication requires making copies of data from a source device to one or more target devices. Target devices can reside on the same network as the host device or can be remotely located on other networks or remote locations. Data replication may be performed for several reasons including device synchronization, disaster recovery planning, content distribution, backup consolidation, etc.

Safeguarding user data is of primary importance. Loss of data can result from electrical outages, device damage or theft, natural or human caused disasters such as floods, tornadoes, fires, and other such events that can cause physical loss of processor-based devices and/or loss of the data stored thereon.

Thus, users often want to have content (e.g., photos) on some or all of their multiple devices. Users also want their content to be backed up and protected, often to a remotely located device. In some instances, users may want only a portion of their content on some devices. Further, in some instances users may want alternative forms of content (e.g., lower resolution photos) on some of their devices. Current systems either require the user to perform a great deal of manual work or require all of the content to be stored in the cloud, which is very expensive and impractical for many users.

In view of the foregoing, it is desirable to implement replication and/or synchronization techniques with improved efficiency, convenience and ease of use.

BRIEF SUMMARY

A method of operation for a data storage system to replicate a plurality of objects across a plurality of processor-based devices may be summarized as including: receiving, by at least one processor, replication configuration information which identifies, for each of the plurality of processor-based devices, whether the processor-based device needs a form of each of the objects, and whether the processor-based device presently has a form of each of the plurality of objects stored on a respective nontransitory processor-readable medium of the processor-based device; storing, by the at least one processor, the replication configuration information on the nontransitory processor-readable medium of each of the plurality of processor-based devices; and causing, by the at least one processor, a transfer of at least one form of at least one of the objects between at least two of the plurality of processor-based devices over a data communications channel based at least in part on the stored replication configuration information.

Storing the replication configuration information may include storing, by the at least one processor, the replication configuration information as an object device link (ODL) table on a nontransitory processor-readable medium of each of the plurality of processor-based devices, the ODL table including a plurality of device-needs flags for each form of each of the plurality of objects, each device-needs flag may be indicative of whether one of the processor-based devices needs a form of the object, the ODL table further including a plurality of device-has flags for each form of each of the plurality of objects, each device-has flag may be indicative of whether one of the processor-based devices currently has a form of the object stored on the respective nontransitory processor-readable medium of the processor-based device.

The method of operation for a data storage system to replicate a plurality of objects across a plurality of processor-based devices may further include updating, by the at least one processor, the respective replication configuration information stored on the nontransitory processor-readable medium of each of the respective plurality of processor-based devices responsive to causing the transfer of at least one form of at least one of the forms of objects between at least two of the plurality of processor-based devices over the data communications channel.

Receiving replication configuration information may include receiving, by the at least one processor, replication configuration information which identifies, for each of the plurality of processor-based devices, whether the processor-based device needs a particular one or more of a plurality of forms of each of the objects, and whether the processor-based device presently has a particular one or more of the plurality of forms of each of the plurality of objects stored on the respective nontransitory processor-readable medium of the processor-based device.

The method of operation for a data storage system to replicate a plurality of objects across a plurality of processor-based devices may further include: receiving, by the at least one processor, replication policy information for at least one of the plurality of processor-based devices; generating, by the at least one processor, replication configuration information for the at least one of the plurality of processor-based devices based on the received replication policy information; and storing, by the at least one processor, the replication configuration information on the nontransitory processor-readable medium of each of the plurality of processor-based devices.

Receiving replication policy information for at least one of the plurality of processor-based devices may include receiving replication policy information which indicates the at least one of the plurality of processor-based devices needs each of a plurality of forms of at least a subset of the plurality of objects. Receiving replication policy information for at least one of the plurality of processor-based devices may include receiving replication policy information which indicates the at least one of the plurality of processor-based devices needs only one form of a plurality of forms of at least a subset of the plurality of objects. At least some of the plurality of objects may be logically associated with at least one container, and receiving replication policy information for at least one of the plurality of processor-based devices may include receiving replication policy information which indicates the at least one of the plurality of processor-based devices needs at least one form of each of the plurality of objects logically associated with a particular container. Receiving replication policy information for at least one of the plurality of processor-based devices may include receiving replication policy information which indicates that at least a plurality of the processor-based devices need to have an original form of at least a subset of the plurality of objects. Receiving replication policy information for at least one of the plurality of processor-based devices may include receiving replication policy information for a first processor-based device which indicates the first processor-based device needs any form of an object which a second processor-based device needs but does not currently have stored in the nontransitory processor-readable medium of the second processor-based device. Receiving replication policy information for at least one of the plurality of processor-based devices may include receiving replication policy information which indicates the at least one of the plurality of processor-based devices needs at least one form of an object based at least in part on at least one of: a rating of the object, a range of ratings of the object, a label logically associated with the object, a keyword logically associated with the object, or a container logically associated with the object. Receiving replication policy information for at least one of the plurality of processor-based devices may include receiving replication policy information for at least one of the plurality of processor-based devices which indicates the at least one of the plurality of processor-based devices needs at least one form of an object based at least in part on a property of the object.

The plurality of objects may be logically stored in hierarchical containers, the method of operation for a data storage system to replicate a plurality of objects across a plurality of processor-based devices may further include automatically generating, by the at least one processor, replication policy information for a child container based on the replication policy information for a parent container of the child container.

The method of operation for a data storage system to replicate a plurality of objects across a plurality of processor-based devices may further include: determining, by at least one processor of one of the processor-based devices, a need for a first form of an object by the one of the processor-based devices; determining, by the at least one processor of the one of the processor-based devices, that a second form of the object is currently stored on the nontransitory processor-readable medium of the one of the processor-based devices, the second form of the object different from the first form of the object; automatically generating, by the at least one processor of the one of the processor-based devices, the first form of the object from the second form of the object; and storing, by the at least one processor of the one of the processor-based devices, the generated first form of the object on the nontransitory processor-readable medium of the one of the processor-based devices.

The method of operation for a data storage system to replicate a plurality of objects across a plurality of processor-based devices may further include causing, by the at least one processor, a replication policy modification interface to be presented to a user via a user interface of at least one of the plurality of processor-based devices.

Causing a replication policy modification interface to be presented may include causing a replication policy modification interface to be presented which allows the user to modify replication policy information for at least two of the plurality of processor-based devices. Causing a replication policy modification interface to be presented may include causing a replication policy modification interface to be presented which provides an indication of replication status for at least two of the plurality of processor-based devices. At least some of the plurality of objects may each include a photo object, and wherein receiving replication configuration information may include receiving replication configuration information which identifies, for each of the plurality of processor-based devices, whether the processor-based device needs each of a plurality of forms of each of the photo objects, and whether the processor-based device presently has each of the plurality of forms of each of the photo objects stored on the respective nontransitory processor-readable medium of the processor-based device, and each of the plurality of forms of each of the photo objects differs from each other at least by photo resolution.

A data storage system for to selectively replicate a plurality of objects across a plurality of processor-based devices may be summarized as including: at least one nontransitory processor-readable medium that stores processor-executable instructions; and at least one processor communicably coupled to the at least one nontransitory processor-readable medium, the at least one processor: receives replication configuration information which identifies, for each of the plurality of processor-based devices, whether the processor-based device needs a form of each of the objects, and whether the processor-based device presently has a form of each of the plurality of objects stored on a respective nontransitory processor-readable medium of the processor-based device; stores the replication configuration information on the nontransitory processor-readable medium of each of the plurality of processor-based devices; and causes a transfer of at least one form of at least one of the objects between at least two of the plurality of processor-based devices over a data communications channel based at least in part on the stored replication configuration information.

The at least one processor may store the replication configuration information as an object device link (ODL) table on the nontransitory processor-readable medium of each of the plurality of processor-based devices, the ODL table comprising a plurality of device-needs flags for each form of each of the plurality of objects, each device-needs flag is indicative of whether one of the processor-based devices needs a form of the object, the ODL table further comprising a plurality of device-has flags for each form of each of the plurality of objects, each device-has flag is indicative of whether one of the processor-based devices currently has a form of the object stored on the respective nontransitory processor-readable medium of the processor-based device. The at least one processor may update the respective replication configuration information stored on the nontransitory processor-readable medium of each of the respective plurality of processor-based devices responsive to the causation of the transfer of at least one form of at least one of the objects between at least two of the plurality of processor-based devices over the data communications channel. The at least one processor may receive replication configuration information which identifies, for each of the plurality of processor-based devices, whether the processor-based device needs a particular one or more of a plurality of forms of each of the objects, and whether the processor-based device presently has a particular one or more of the plurality of forms of each of the plurality of objects stored on the respective nontransitory processor-readable medium of the processor-based device. The at least one processor may: receive replication policy information for at least one of the plurality of processor-based devices; generate replication configuration information for the at least one of the plurality of processor-based devices based on the received replication policy information; and store the replication configuration information on the nontransitory processor-readable medium of each of the plurality of processor-based devices. The at least one processor may receive replication policy information which indicates the at least one of the plurality of processor-based devices needs each of a plurality of forms of at least a subset of the plurality of objects. The at least one processor may receive replication policy information which indicates the at least one of the plurality of processor-based devices needs only one form of a plurality of forms of at least a subset of the plurality of objects. At least some of the plurality of objects may be logically associated with at least one container, and the at least one processor may receive replication policy information which indicates the at least one of the plurality of processor-based devices needs at least one form of each of the plurality of objects logically associated with a particular container. The at least one processor may: determine a physical location of a first processor-based device of the plurality of processor-based devices relative to a physical location of a second processor-based device of the plurality of processor-based devices; and receive replication policy information for the first processor-based device which indicates the first processor-based device needs at least one form of each object in at least a subset of the plurality of objects unless the at least one form of the respective object is currently stored on the nontransitory processor-readable medium of the second processor-based device physically proximate the first processor-based device. The at least one processor may receive replication policy information for a first processor-based device which indicates the first processor-based device needs any form of an object which a second processor-based device needs but does not currently have stored in the nontransitory processor-readable medium of the second processor-based device. The at least one processor may receive replication policy information which indicates the at least one of the plurality of processor-based devices needs at least one form of an object based at least in part on at least one of: a rating of the object, a range of ratings of the object, a label logically associated with the object, a keyword logically associated with the object, or a container logically associated with the object. The at least one processor may receive replication policy information for at least one of the plurality of processor-based devices which indicates the at least one of the plurality of processor-based devices needs at least one form of an object based at least in part on a determined source of the object.

The plurality of objects may be logically stored in hierarchical containers, and the at least one processor may automatically generate replication policy information for a child container based on the replication policy information for a parent container of the child container.

The at least one processor of one of the processor-based devices may: determine a need for a first form of an object by the one of the processor-based devices; determine that a second form of the object is currently stored on the nontransitory processor-readable medium of the one of the processor-based devices, the second form of the object different from the first form of the object; automatically generate the first form of the object from the second form of the object; and store the generated first form of the object on the nontransitory processor-readable medium of the one of the processor-based devices. The at least one processor may cause a replication policy setting interface to be presented to a user via a user interface of at least one of the plurality of processor-based devices. The at least one processor may cause a replication policy setting interface to be presented which allows the user to modify replication policy information for at least two of the plurality of processor-based devices. The at least one processor may cause a replication policy setting interface to be presented which provides an indication of replication status for at least two of the plurality of processor-based devices. At least some of the plurality of objects may each include a media object having a plurality of forms which differ from each other at least by resolution.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 6 is a diagram of a sample object device link (ODL) table of an object management system, according to one illustrated implementation.

DETAILED DESCRIPTION

Figure 1:
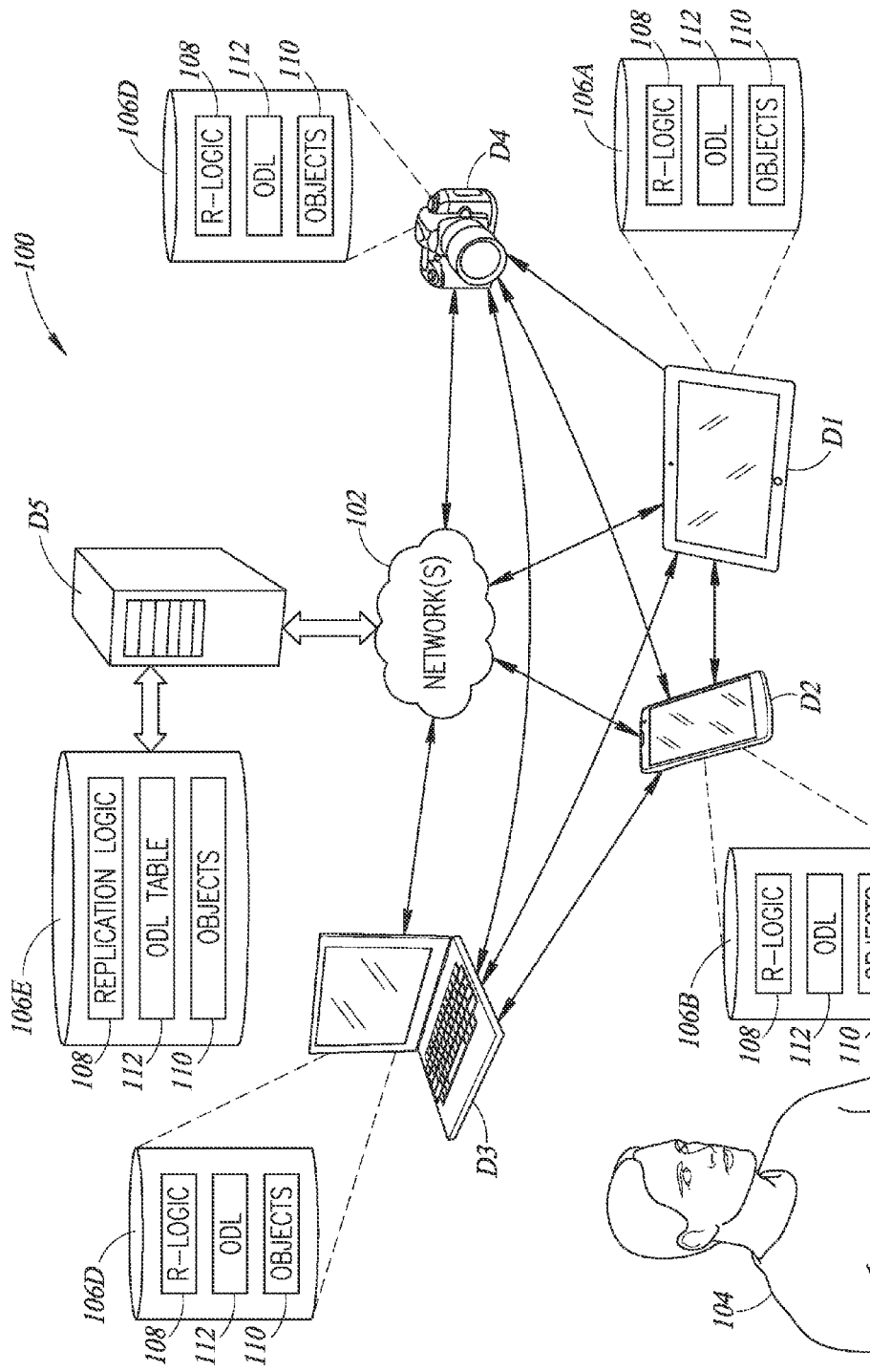
FIG. 1 is a networked environment in which an object management system may be implemented, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure address some or all of the aforementioned issues by providing systems and methods for automatic replication of content across a user's devices in a way that allows for full or partial replication, alternate forms, local network and remote location protection, with users being able to use their own storage and/or provided storage in the cloud. In some implementations, instances or copies of data objects (e.g., image files, video files, audio files) may exist in a plurality of forms or representations. For example, in the case of image files, the image data object may exist in multiple forms wherein each form is an image file having a different resolution from the other forms of the data object. In some of the examples discussed below, image data objects may be in the form of original image files, lower resolution preview image files, and even lower resolution thumbnail image files.

In some implementations, the systems and methods provide partial or full object replication between multiple processor-based devices utilizes a form of a multi-master architecture in which any device can provide content to any other device to which the device is connected. No device is designated as a special master device/server from which all other devices must fetch content. Some implementations provide temporary protection of instances of original forms of objects, for example, when a user is traveling. Some implementations provide for relaying and shuttling of instances of objects across multiple devices via one or more networks and/or via peer-to-peer wired or wireless communications. Additionally, in some implementations discussed below, support for container and individual object replication policies with inheritance is provided. It should be appreciated that, as used herein, sending or receiving objects, or one or more forms of objects, may be equivalent to sending or receiving instances or copies of objects, or instances or copies of one or more forms of the objects. Such functionality is discussed in further detail below with reference to the figures.

FIG. 1 shows an example networked environment in which implementations of an object management system 100 of the present disclosure may be practiced. The networked environment includes a plurality of user processor-based devices D1-D4 and one or more service provider processor-based devices D5 (only one shown for clarity). The processor-based devices may be communicatively coupled with each other via one or more wired and/or wireless networks 102 (e.g., Wi-Fi, cellular, Internet). The service provider processor-based device D5 may include two or more devices (e.g., servers) interconnected via one or more networks which share resources, software, and/or data to any or all of the plurality of user processor-based devices and/or other devices. For example, the service provider processor-based device D5 may be one or more devices implemented utilizing a cloud-based architecture.

The user processor-based devices D1-D4 may represent various devices in the domain of a user 104. That is, the plurality of user processor-based devices D1-D4 may be accessed, used, controlled and/or owned by the user 104. Such user processor-based devices D1-D4 may be located in different locations, such as the user's home, school, office, vehicle, person, etc. Moreover, such user processor-based devices D1-D4 may be used for different applications, such as entertainment, education, occupation, communication, travel, etc. Similarly, the service provider processor-based device D5 may also have a portion of its storage and/or processing capacity allocated to the user 104.

In the illustrated implementation, the user processor-based devices D1-D4 are depicted as a tablet computer D1, a smartphone D2, a laptop computer D3, and a digital camera D4. The user processor-based devices D1-D4 may include other types of devices, such as a desktop computer, gaming console, set-top box, video camera, audio recorder, media player, smart watch, smart TV, remote storage device accessible via a network (e.g., using a web client or application), etc.

In addition to being communicatively coupled through the one or more networks 102, some or all of the user processor-based devices D1-D4 may communicate directly with each other without communicating through the network 102 and/or without communicating through an intermediate access point. For example, the user processor-based devices D1-D4 may communicate with each other through a local area network, wireless ad hoc network, Wi-Fi Direct®, USB, Bluetooth®, NFC, 802.15 (ZigBee®), etc. As discussed further below, such communications may enable various "offline" replication, synchronization, relay, shuttle, or other operations to be carried out without communicating through the one or more networks 102, which may advantageously provide communications when one or more user processor-based devices D1-D4 is not able to connect to the one or more networks or to another one of the devices. In particular, in some implementations changes can occur to objects and policies which are replicated without the devices being connected. Once the devices are connected, the policies are enforced and the content is synchronized.

The processor-based devices D1-D5 each include a respective nontransitory processor-readable medium 106A-106E. Some or all of the processor-based devices D1-D5 may include a replication application or logic 108 which utilizes the resources of the respective processor-based device to perform various replication, synchronization, relay, shuttle, or other operations. It is noted that in some implementations, the digital camera D4 may not include the replication logic 108. In these instances, the digital camera D4 may be used as an ingestion device which provides content to one or more computing devices, such as the devices D1, D2, D3 or D5, which in turn replicate the content to other devices.

The processor-based devices D1-D5 collectively store the user's collection of objects 110, which may include various types of data objects such as image files, audio files, video files, documents, etc. As discussed further below, each of the objects may be represented in multiple forms, and one or more forms of each object may be simultaneously stored on one or more processor-based devices D1-D5. For example, an instance of an original form of an image may be stored on the nontransitory processor-readable medium 106D of the digital camera D4 and the nontransitory processor-readable medium 106C of laptop computer D3 of the user 104. As another example, an instance of an original form of an image may be stored on the nontransitory processor-readable medium 106C of the laptop computer D3, while an instance of a preview form of the image may be stored on the nontransitory processor-readable medium 106B of the smartphone D2 of the user 104, and an instance of a thumbnail form of the image may be stored on the nontransitory processor-readable medium 106A of the tablet computer D1 of the user.

As discussed in further detail below, each of the processor-based devices D1-D5 may store an object device link (ODL) table 112 which is replicated on a respective nontransitory processor-readable medium thereof which is used to perform object replication, synchronization, relay, shuttle, or other operations between the processor-based devices. The ODL table 112 stored on each of the processor-based devices D1-D5 allows each of the processor-based devices to be aware of whether each other processor-based device currently has a form of an object or needs a form of an object. The ODL table may be replicated to each of the devices using any suitable replication technology. An example ODL table is shown in FIG. 6 and discussed below.

Figure 2:
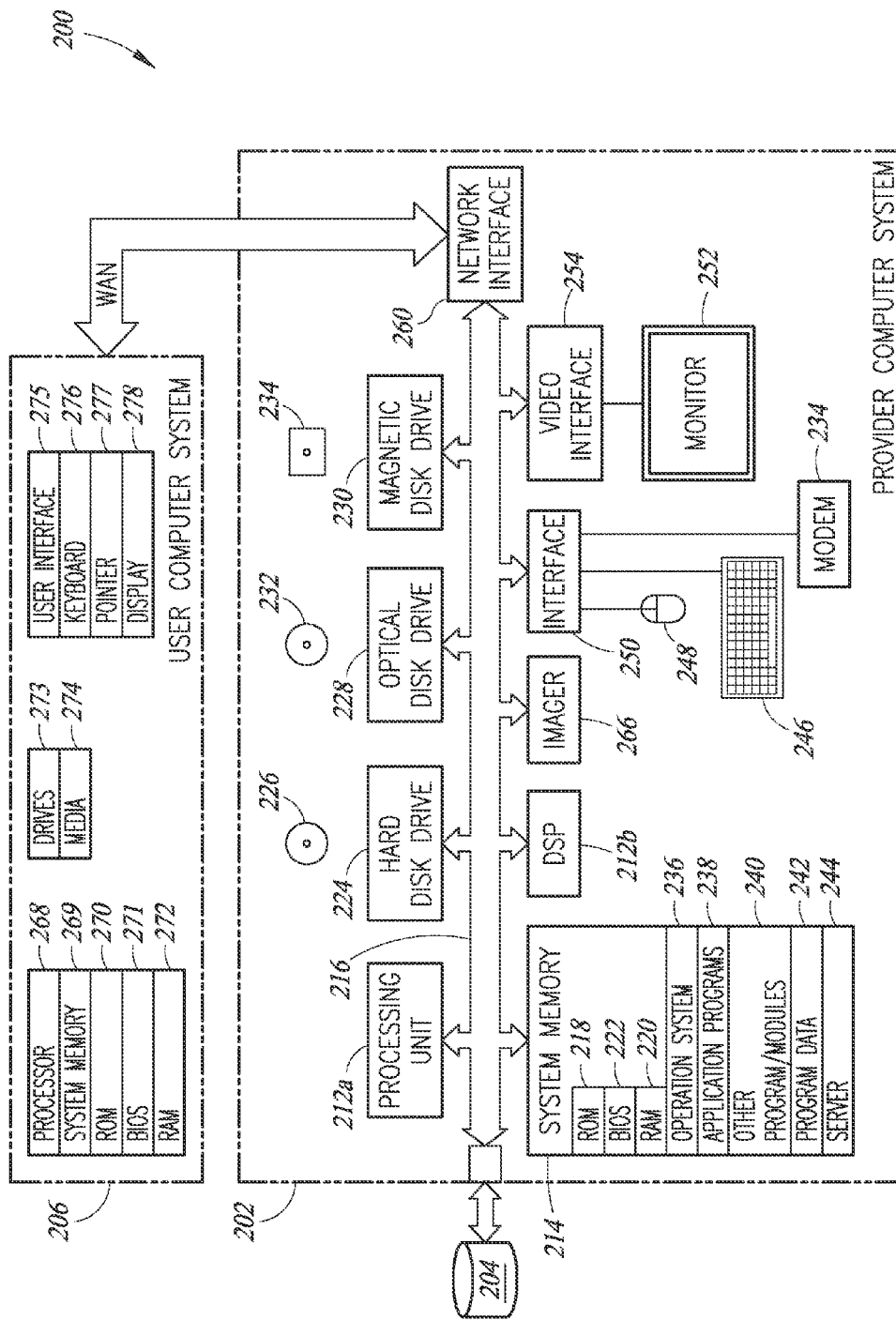
FIG. 2 is a functional block diagram of an object management system and user processor-based device, according to one illustrated implementation.

FIG. 2 shows a networked environment 200 comprising one or more service provider server computer systems or devices 202 (only one illustrated) and one or more associated nontransitory computer- or processor-readable storage medium 204 (only one illustrated). The associated nontransitory computer- or processor-readable storage medium 204 is communicatively coupled to the service provider server computer system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 200 also includes one or more user processor-based systems or devices 206 (only one illustrated). For example, the user processor-based systems 206 may be representative of any one of the user processor-based devices of FIG. 1. The user processor-based systems 206 are communicatively coupled to the service provider server computer system(s) 202 by one or more communications channels, for example, one or more wide area networks (WANs) 210, for instance the Internet or Worldwide Web portion thereof.

In some implementations, the processor-based systems 206 may function as a client to the service provider server computing system 202. In some implementations, the service provider server computer systems 202 may function as a server to receive requests or information from the processor-based systems 206. In some implementations, each of the user processor-based systems 206 may operate independently of the service provider server computing system 202 (e.g., as multi-masters). In some implementations, the service provider server computing system 202 may not be utilized at all, and the system may be implemented utilizing two or more processor-based devices associated with the user, which may include one or more cloud-based storage devices.

The networked environment 200 may employ other computer systems and network equipment, for example, additional servers, proxy servers, firewalls, routers and/or bridges. The service provider server computer systems 202 will at times be referred to in the singular herein, but this is not intended to limit the implementations to a single device since in typical implementations there may be more than one service provider server computer systems 202 involved. Unless described otherwise, the construction and operation of the various blocks shown in FIG. 2 are of conventional design. As a result, such blocks need not be described in further detail herein, as they will be understood by those skilled in the relevant art.

The service provider server computer systems 202 may include one or more processing units 212a, 212b (collectively 212), a system memory 214 and a system bus 216 that couples various system components, including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the service provider server computer system(s) 202, such as during start-up.

The service provider server computer systems 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the service provider server computer system 202. Although the depicted service provider server computer systems 202 is illustrated employing a hard disk drive 224, optical disk drive 228 and magnetic disk drive 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. The system memory 214 may also include communications programs, for example, a server 244 that causes the service provider server computer system 202 to serve electronic information or files via the Internet, intranets, extranets, telecommunications networks, or other networks as described below. The server 244 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the service provider server computer system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The service provider server computer system(s) 202 can include other output devices, such as speakers, printers, etc.

The service provider server computer systems 202 can operate in a networked environment 200 using logical connections to one or more remote computers and/or devices. For example, the service provider server computer systems 202 can operate in a networked environment 200 using logical connections to one or more processor-based systems 206. Communications may be via a wired and/or wireless network architecture, for instance, wired and wireless enterprise-wide computer networks, intranets, extranets, and/or the Internet. Other implementations may include other types of communications networks including telecommunications networks, cellular networks, paging networks, and other mobile networks. There may be any variety of computers, switching devices, routers, bridges, firewalls and other devices in the communications paths between the service provider server computer systems 202 and the processor-based systems 206.

The user processor-based systems 206 will typically take the form of end user processor-based devices, for instance, personal computers (e.g., desktop or laptop computers), netbook computers, tablet computers, smartphones, personal digital assistants, cameras, gaming consoles, set-top boxes, workstation computers and/or mainframe computers, and the like, executing appropriate instructions. These processor-based systems 206 may be communicatively coupled to one or more server computers. For instance, processor-based systems 206 may be communicatively coupled externally via one or more end user client entity server computers (not shown), which may implement a firewall. The server computers 202 may execute a set of server instructions to function as a server for a number of processor-based systems 206 (e.g., clients) communicatively coupled via a LAN at a facility or site, and thus act as intermediaries between the processor-based systems 206 and the service provider server computer system(s) 202. The processor-based systems 206 may execute a set of client instructions to function as a client of the server computer(s), which are communicatively coupled via a WAN.

The processor-based systems 206 may include one or more processing units 268, system memories 269 and a system bus (not shown) that couples various system components including the system memory 269 to the processing unit 268. The processor-based systems 206 will at times each be referred to in the singular herein, but this is not intended to limit the implementations to a single processor-based systems 206. In typical implementations, there may be more than one processor-based system 206 and there will likely be a large number of processor-based systems 206.

The processing unit 268 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, a Snapdragon processor from Qualcomm, an Exynos processor from Samsung, or an Ax processor from Apple. Unless described otherwise, the construction and operation of the various blocks of the processor-based systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the end user client computer systems 206, such as during start-up.

The processor-based systems 206 may also include one or more media drives 273, e.g., a hard disk drive, magnetic disk drive, WORM drive, and/or optical disk drive, for reading from and writing to computer-readable storage media 274, e.g., hard disk, optical disks, and/or magnetic disks. The nontransitory computer-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated nontransitory computer-readable storage media 274, provide nonvolatile storage of computer readable instructions, data structures, program modules and other data for the processor-based systems 206. Although described as employing computer-readable storage media 274 such as hard disks, optical disks and magnetic disks, those skilled in the relevant art will appreciate that processor-based systems 206 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated WebPages, other pages, screens or services hosted by the service provider server computer system 114.

In particular, the system memory 269 may include communications programs that permit the processor-based systems 206 to exchange electronic or digital information or files or data or metadata with the service provider server computer system 202. The communications programs may, for example, be a Web client or browser that permits the processor-based systems 206 to access and exchange information, files, data and/or metadata with sources such as Web sites of the Internet, corporate intranets, extranets, or other networks. Such may require that the processor-based systems 206 have sufficient right, permission, privilege or authority for accessing a given Website, for example, one hosted by the service provider sever computer system(s) 202. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the processor-based systems 206 via a user interface 275 through input devices such as a touch screen or keyboard 276 and/or a pointing device 277 such as a mouse. Other input devices can include a microphone, joystick, game pad, tablet, imager, scanner, etc. These and other input devices are connected to the processing unit 268 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The processor-based systems 206 can include other output devices, such as speakers, printers, etc.

Figure 3:
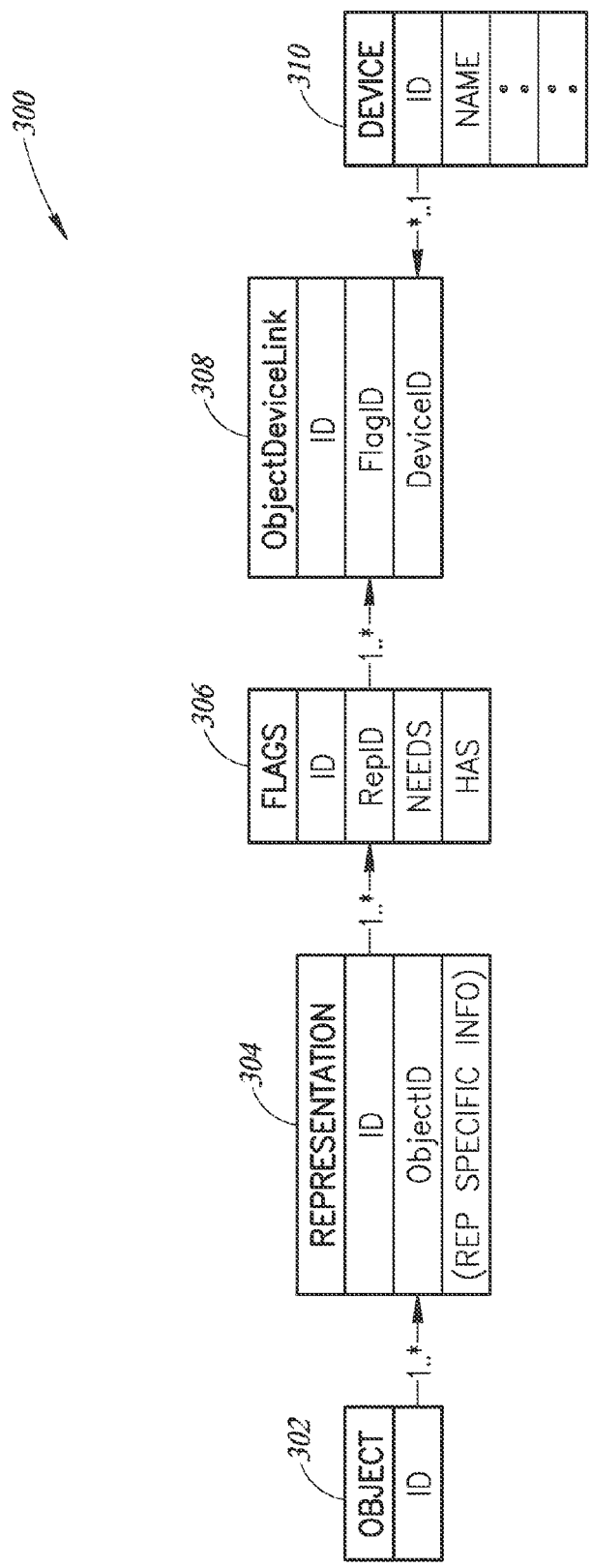
FIG. 3 is a diagram of a conceptual schema for an object management system, according to one illustrated implementation.

FIG. 3 shows a conceptual schema 300 for an object management system, such as the object management systems 100 and 200 shown in FIGS. 1 and 2, respectively. The conceptual schema 300 includes objects 302, representations or forms 304, flags 306, object device links (ODLs) 608, and devices 610. Each object 302 is uniquely identified by an 'ObjectId' identifier (e.g., Photo). Similarly, each device 310 is uniquely identified by a 'DeviceId' identifier (e.g., Laptop). Each object 302 may have multiple forms 304 (e.g., Preview, Thumbnail). For example, as discussed above, an image object may have an original form, a preview form and a thumbnail form.

A special form of objects, designated 'O,' is the original or complete form of the object. For example, in the case of photo media, the original form of the object is the actual original image (or copy thereof), whereas other forms can contain a preview ('P') or a thumbnail ('T'), which are down-sampled resolutions of the original form.

The flags 306 represent which forms of an object 302 a particular device 310 needs ("Needs Flags"), and which forms of an object a particular device currently has ("Has Flags) stored on the nontransitory processor-readable medium thereof. The ODLs 308 contain synchronization information about the object 302 and the devices 310 in the object management system. In particular, the ODLs contain 'ObjectId,' 'DeviceId,' 'Needs Flags,' and 'Has Flags.' Such information may be used to implement various replication policies. As discussed in the examples provided below, various configurations of the ObjectId,' 'DeviceId,' 'Needs Flags' and 'Has Flags' provide powerful tools for implementing sophisticated replication policies and/or configurations to accomplish user goals such as partial replication, complete backup, remote backup, etc. The general formula for representing the mathematical operations may be expressed as:

$$\text{Device.Needs(Form)}=\text{formula}$$

Figure 4:
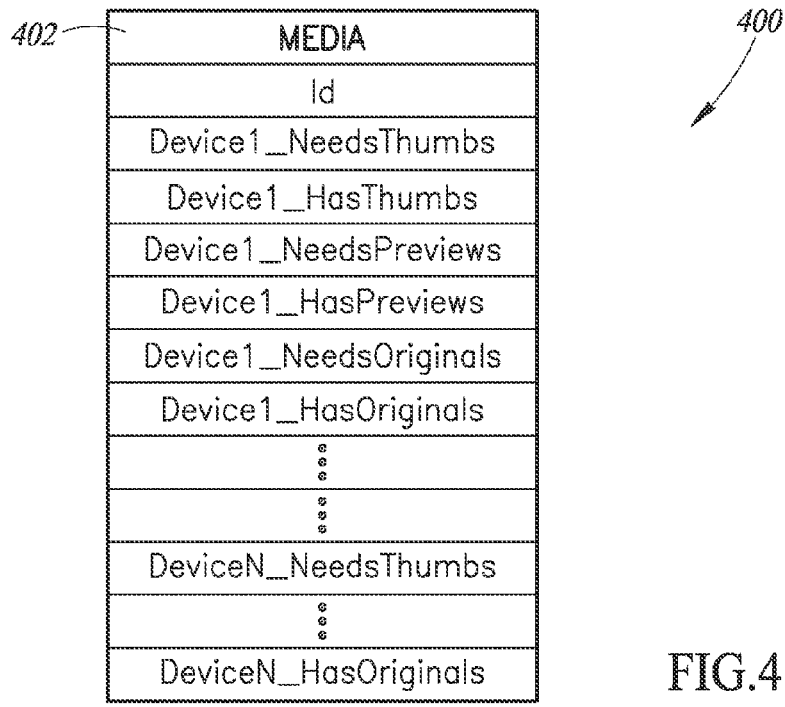
FIG. 4 is a diagram of an optimized media schema for an object management system, according to one illustrated implementation.

FIG. 4 shows an optimized media schema 400 for an object management system. In this example, the object is media 402 having an original form, a preview form, and a thumbnail form. Additionally, the user associated with the media has N devices, labeled Device1 to DeviceN, which may include one or more remote storage devices (e.g., cloud-based storage). As shown in the table of FIG. 4, the media includes a unique identifier 'Id.' Further, for each of the user's devices, 'Needs' and 'Has' flags indicate whether the device needs each form of the object and whether the device currently has each form of the object stored on the nontransitory processor-readable medium thereof. For example, the following six flags are used for Device1: Device1_NeedsThumbs, Device1_HasThumbs, Device1_NeedsPreviews, Device1_HasPreviews, Device1_NeedsOriginals, and Device1_HasOriginals. The same six flags are used for each of the other user devices (i.e., Device2 to DeviceN).

Figure 5:
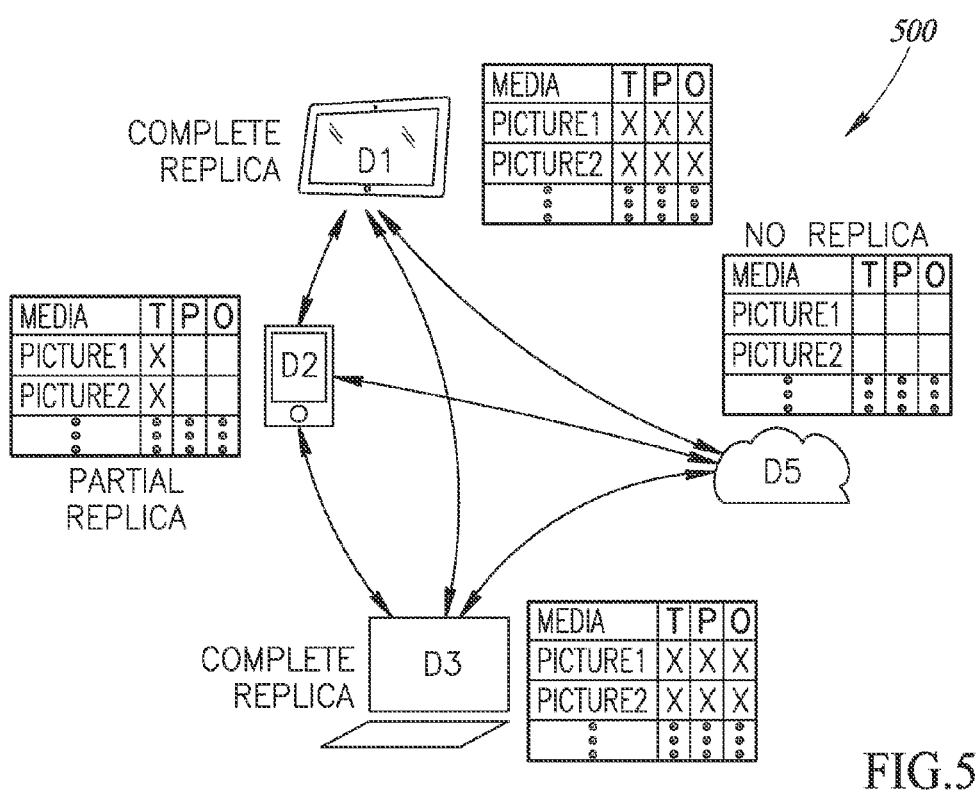
FIG. 5 is a diagram of a simplified sample configuration for an object management system, according to one illustrated implementation.

FIG. 5 shows a simplified sample configuration 500 for an object management system, such as the object management systems 100 and 200 of FIGS. 1 and 2, respectively. This example depicts the user's tablet computer D1, the user's smartphone D2, the user's laptop computer D3, and the provider system D5 of FIG. 1. Each of the devices D1, D2, D3 and D5 includes a replication policy for a plurality of objects. In the illustrated example, each of the devices D1, D2, D3 and D5 includes a replication policy for picture objects (PICTURE1, PICTURE2, etc.). The replication policy of each of the devices D1, D2, D3 and D5 includes information about whether each device currently has each of three forms of a picture—original form (O), preview form (P), and thumbnail form (T). In the illustrated example, the user's tablet computer D1 and the laptop computer D3 are configured to store complete replicas (all forms) of the pictures. The user's smartphone D2 is configured to store a partial replica of the pictures. In particular, the user's smartphone D2 is configured to store only thumbnails (T) of the pictures. In this example, the provider system or cloud D5 is configured to store no replicas of the pictures.

FIG. 6 shows a sample object device link (ODL) table 600 of an object management system. In the illustrated example, pictures are used for the objects for explanatory purposes, but it should be appreciated that the objects may be other types of data objects. As shown, for each of a plurality of picture objects, the ODL table 600 includes a plurality of flags which indicate whether each of the processor-based devices currently has an instance of a particular form (e.g., original, thumbnail, preview) of the picture object ("Has Flags"), and a plurality of flags which indicate whether each of the processor-based devices needs an instance of a particular form of the picture object ("Needs Flags"). The ODL table 600 is replicated to each of the processor-based devices of the system, so that all devices know about their own Needs Flags and Has Flags values, as well as the Needs Flags values and Has Flags values of all other devices. In some implementations, each device can change the Needs Flag value for any other device even when not directly connected to the other device.

Figure 7:
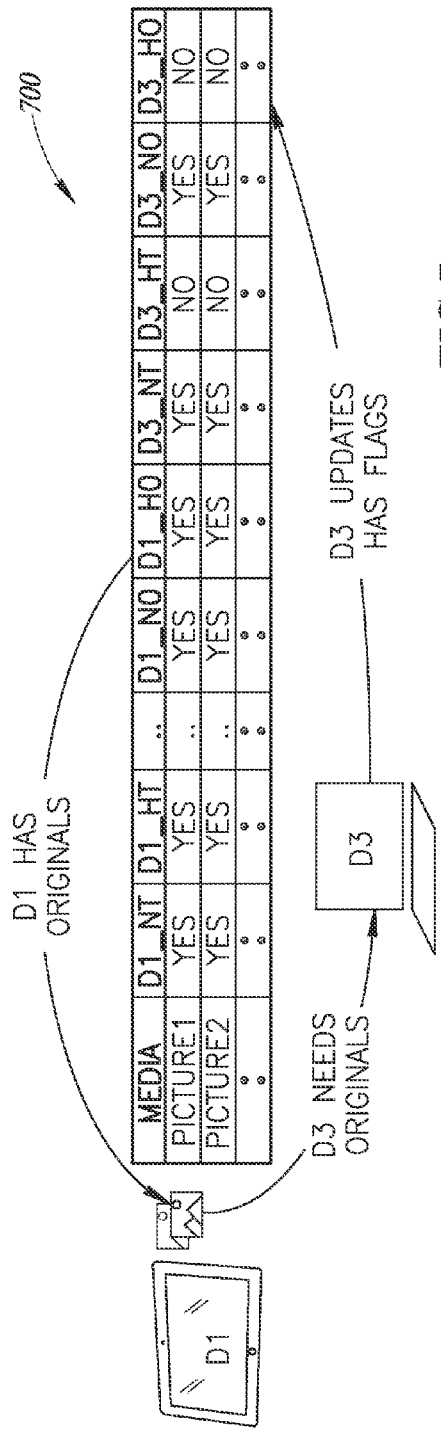
FIG. 7 is a diagram showing the operation of an object management system to provide complete replication of objects, according to one illustrated implementation.

FIG. 7 is a diagram 700 showing operation of an object management system to provide complete replication of objects. In this example, the user's tablet computer D1 and laptop computer D3 are shown. The laptop computer D3 may be used as a protection device, in that the laptop computer D3 will replicate instances of all forms of all objects from any device which has them. The formula for such operation may be expressed as:

$$D3.\text{Needs}(\text{Any})=\text{True}$$

In the example, shown, the laptop computer D3 needs but does not have original and thumbnail forms of the picture objects. The replication logic determines that the tablet computer D1, which is communicatively coupled to the laptop computer D3, currently has the original and thumbnail forms of the picture objects. In response, the laptop computer D3 obtains the original and thumbnail forms of the picture objects from the tablet computer D1. Then, the laptop computer D3 updates the Has Flags in the ODL table, which is replicated to the other devices of the system.

Figure 8:
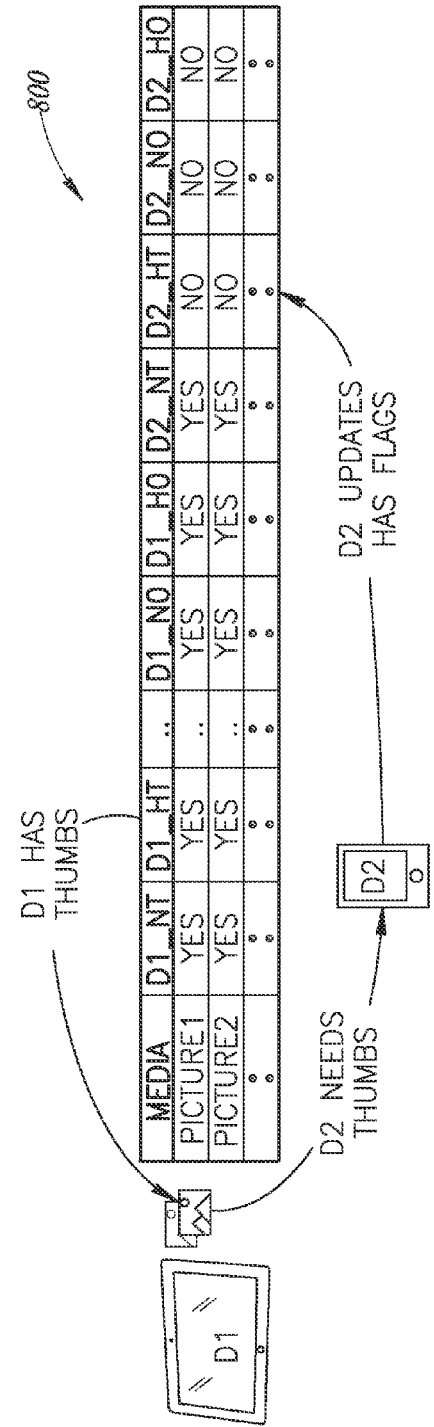
FIG. 8 is a diagram showing the operation of an object management system to provide partial replication of objects, according to one illustrated implementation.

FIG. 8 is a diagram 800 showing operation of an object management system to provide partial replication of objects. In this example, the user's tablet computer D1 and the user's smartphone D2 are shown. The user's smartphone D2 is configured as a browsing device which stores the thumbnail form of picture objects but not the original form. The replication logic determines that the tablet computer D1 is connected to the smartphone D2, and the tablet computer D1 has the thumbnail form of the picture objects stored on a nontransitory processor-readable medium thereof. The smartphone D2 then obtains the thumbnail forms of the pictures from the tablet computer D1, and updates the Has Flags of the ODL table accordingly.

$$D2.\text{Needs}(\text{Thumbs})=\text{True}$$

Figure 9:
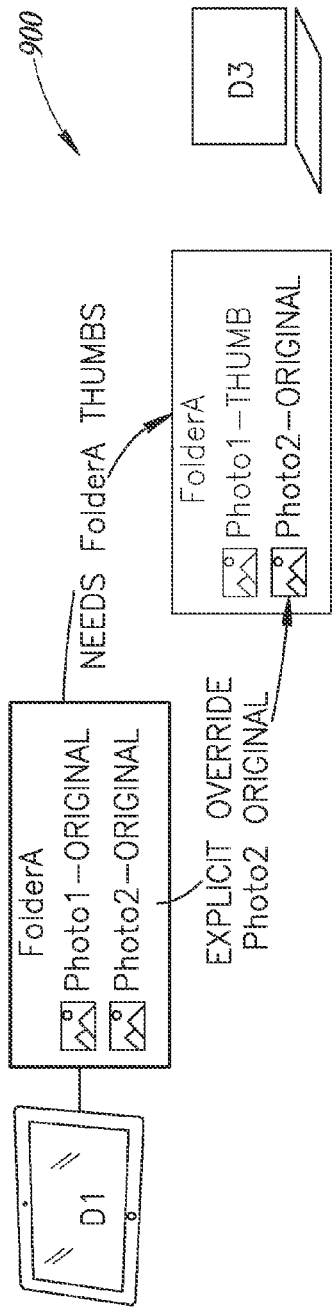
FIG. 9 is a diagram showing the operation of an object management system to provide container-based replication, according to one illustrated implementation.

FIG. 9 is a diagram 900 showing operation of an object management system to provide container-based replication. In this example, the user's tablet computer D1 and the user's laptop computer D3 are shown. The laptop computer D3 is configured to replicate all/partial objects from any device where the object is contained within a specific container (e.g., album, folder, day, month). In the illustrated example, the laptop computer D3 is configured to replicate all objects contained within a folder FolderA. For example, when the laptop computer D3 is connected to the user's tablet computer D1 (e.g., directly or via a suitable network), the laptop computer D3 will replicate all objects stored in FolderA by the tablet computer D1.

In some implementations, containers (e.g., folders) in the object management system are constructed as a hierarchical structure. In these implementations, the system automatically creates logical ODL records for a child container inherited from a parent container. For example, FolderB and FolderC may be created within a FolderA. In this example, the device D1 may have all content stored on a nontransitory processor-readable medium thereof. If the device D3 needs a form (e.g., previews) of the content in FolderA, the system automatically creates ODL logic which indicates the device D3 also needs the form of the content in FolderB and FolderC. The formula for this logic may be expressed as:

$$D3.\text{Needs}(\text{Folder}A.\text{Previews})$$

Then, the system will automatically create inherited logical ODL records as follows:

$$D3.\text{Needs}(\text{Folder}B.\text{Previews})$$

$$D3.\text{Needs}(\text{Folder}C.\text{Previews})$$

As a result, the device D3 will obtain all of the previews contained within FolderA and its subfolders FolderB and FolderC based on the policy settings of FolderA without requiring the user to manually establish policy settings for FolderB and FolderC.

The system may also provide an interface which allows the user to override the inherited policy. For example, the user may want all original forms of the content in FolderC on the device D3 rather than just the previews. This example override may be expressed as:

$$D3.\text{Needs}(\text{Folder}C.\text{Originals})$$

which causes the device D3 to obtain the original form of the content of FolderC.

The general rule for such container inheritance may be expressed as:

$$\text{Device}.\text{Needs}(\text{Container})=\text{Device}.\text{Needs}(\text{Container}.\text{Parent})$$

Figure 10:
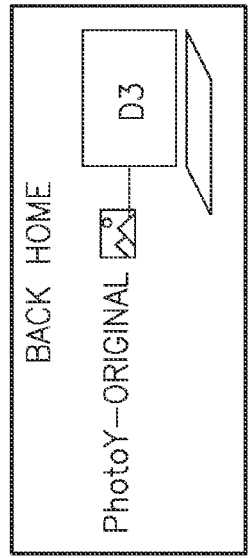
FIG. 10 is a diagram showing the operation of an object management system to provide travel protection, according to one illustrated implementation.
Figure 10:
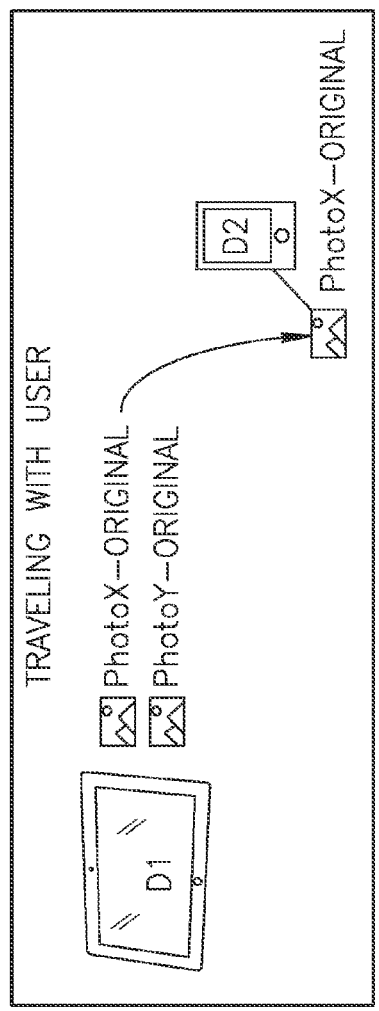

FIG. 10 is a diagram 1000 showing operation of an object management system to provide travel protection. In this example, the user is traveling with the tablet computer D1 and the smartphone D2. The user's laptop computer D3 is located remotely at the user's home, for example. In this example, the system may be configured so that a device always needs original forms of content so long as the number of devices which have the original forms is less than a limit (e.g., 2). For example, the travel devices, such as the tablet computer D1 and the smartphone D2, may be configured to need (and hold) instances of the original form of objects unless at least two other devices traveling with the user currently have a copy of the original form stored thereon. For example, if the tablet computer D1 has the original form of PhotoX, the smartphone D2 will obtain the original form of the PhotoX from the tablet computer D1 if the tablet computer D1 is the only device which has the original form of PhotoX. Thus, should something happen to one of the user's devices while traveling, the object management system ensures that at least one other device traveling with the user retains a copy of the original forms of the objects. The formula for this functionality may be expressed as:

$D2.\text{Needs}(\text{Original}) = \text{Count}(\text{Devices.Has}(\text{Original})) < \text{Limit}$ The default Limit may be set to 2, so the device D2 will automatically obtain all originals that are on D1 that have not been stored elsewhere. In some implementations, the user may selectively adjust the Limit to other values (e.g., 3, 5). In the travel protection example of FIG. 10, the user's laptop computer D3 located at the user's home may be configured to need original forms of all object stored on the travel devices while the user is traveling. Accordingly, the laptop computer D3 obtains original forms of objects stored on the travel devices when one or more of such devices are communicatively coupled to the laptop computer D3 through a suitable network (e.g., Internet, direct connection after user returns home). Then, the smartphone D2 may automatically detect that the original form of content is already stored on two devices (i.e., devices D1 and D3), and may then delete its copies of the original form of the content by setting the appropriate Needs Flags to FALSE.

Figure 11A:
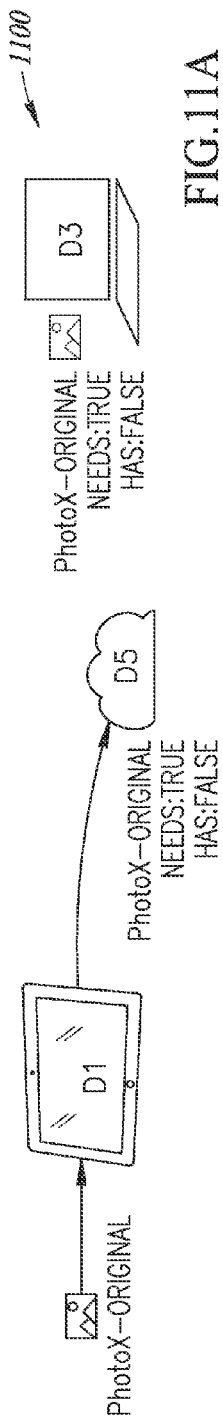
FIGS. 11A-11D are diagrams showing the progressive operation of an object management system to provide shuttling of objects, according to one illustrated implementation.
Figure 11B:
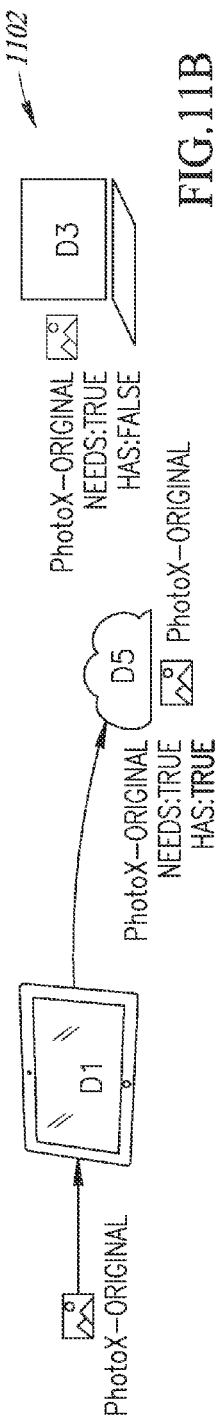
Figure 11C:
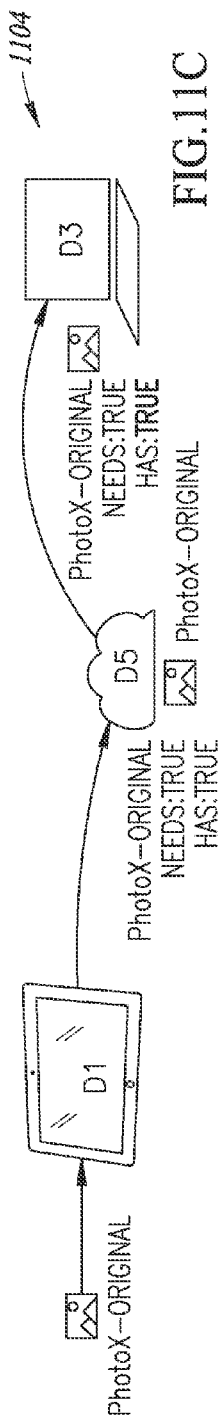
Figure 11D:
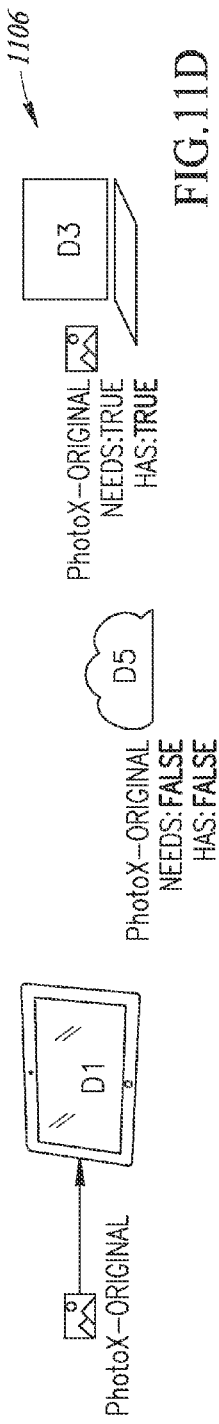

FIGS. 11A-11D are diagrams 1100, 1102, 1104 and 1106, respectively, showing the progression of an operation of an object management system to provide shuttling of instances of objects. In this example, the user's laptop computer D3 and the user's tablet computer D1 do not have direct connectivity to each other. The provider system D5, which is communicatively coupled to both the tablet computer D1 and the laptop computer D3, is used as an intermediate device to shuttle an instance of an original form of a photo (e.g., PhotoX) from the tablet computer D1 to the laptop computer D3. That is, the provider system D5 is configured to "need" any form of an object that the laptop computer D3 needs but does not currently have. The formula for this functionality may be expressed as:

$D5.\text{Needs}(\text{Any}) = D3.\text{Needs}(\text{Any}) \text{ AND NOT } D3.\text{Has}(\text{Any})$ As shown in FIG. 11A, initially the tablet computer D1 has a copy of the original form of PhotoX. That is, $D1.\text{Has}(X) = \text{TRUE}$ The Needs Flags for the original form of PhotoX for the laptop computer D3 is set to TRUE, and the corresponding Has Flag is set to FALSE, which causes the Needs Flag for the original form of PhotoX for the provider system D5 to be set to TRUE. This functionality may be expressed as:

$D3.\text{Needs}(X) = \text{TRUE}, D3.\text{Has}(X) = \text{FALSE}$ which causes $D5.\text{Needs}(X) = \text{TRUE}$ In FIG. 11B, the provider system D5 obtains PhotoX from the tablet computer D1, and updates the Has Flag for the provider system to TRUE (i.e., $D5.\text{Has}(X) = \text{TRUE}$). Then, as shown in FIG. 11C, the laptop computer D3, which is connected to the provider system D5, obtains PhotoX from the provider system and updates the Has Flag for the laptop computer D3 to TRUE (i.e., $D3.\text{Has}(X) = \text{TRUE}$ causes $D5.\text{Needs}(X) = \text{FALSE}$). As shown in FIG. 11D, since the laptop computer D3 now has PhotoX, the provider system D5 sets its Needs Flag to FALSE, and deletes the copy of PhotoX stored by on the nontransitory processor-readable medium of the provider system (i.e., $D5.\text{Needs}(X) = \text{FALSE}$).

In addition to the example replication/synchronization policies depicted in FIGS. 7, 8, 9, 10 and 11A-11D and discussed above, many other configurations may be implemented. For example, a device may be configured to replicate only objects which have particular properties, such as a particular rating (e.g., 4 stars), or a particular range of ratings (e.g., 3 or more stars). Functionality to configure a device to need objects which have a 5 star rating may be expressed as:

$\text{Device.Needs}(5\text{Star}) = \text{TRUE}$

As another example, a device may be configured to replicate only objects that have a particular label, such as a color label, associated with the object. As yet another example, a device may be configured to replicate only objects that have a specific keyword or tag associated with the object.

Further, in some implementations, devices may be configured to replicate and retain objects dependent on which device originally ingested or imported the object. For example, the smartphone D2 may be configured to replicate and retain all objects captured by the camera of the smartphone D2. Such functionality may be expressed as:

$D2.\text{Needs}(\text{Original}) = \text{Original.ImportedOn} = D2$

As another example, the laptop computer D3 may be configured to replicate and retain all objects captured by the user's digital camera D4.

In some implementations, a device may be configured to need an object only if, as a result of a load-balancing calculation, the device is set to need the object. The formula for this functionality, which automatically replicates any content not held by device D2 to device D1, may be expressed as:

$D1.\text{Needs}(\text{Any}) = \text{NOT } D2.\text{Needs}(\text{Any})$

As another example, a first device may be configured to obtain all originals that a second device does not have. This implementation may be advantageous in situations where the nontransitory processor-readable medium of the second device is full and can no longer store original forms of objects, in situations where the user wishes to save memory storage space on one or more user devices, or in situations where the user wishes to limit cloud storage used (e.g., due to cost). The first device may store such originals (or other forms) the second device needs but does not have. By changing the Needs Flag of a device to FALSE dependent on particular conditions (e.g., need to save space), content may be removed from the device (e.g., based on a caching policy).

As discussed above, the object management system contains global distributed knowledge about where (i.e., which devices) forms of objects are stored. Thus, if a device no longer has a certain form of an object, the device knows which other devices have the form of the object and as a result is able to obtain the form.

In some implementations, devices will not replicate forms which they are able to generate locally. For example, a device may have an original form of an object and may need a preview form of the object. Since the device may be able to generate the preview form from the original form, the device may simply generate the preview form rather than replicate the preview form from another device. Such functionality may be expressed as:

Device.Has(form)=Device.Has(otherForm) AND
Device.CanMake(form from otherForm)

Figure 12:
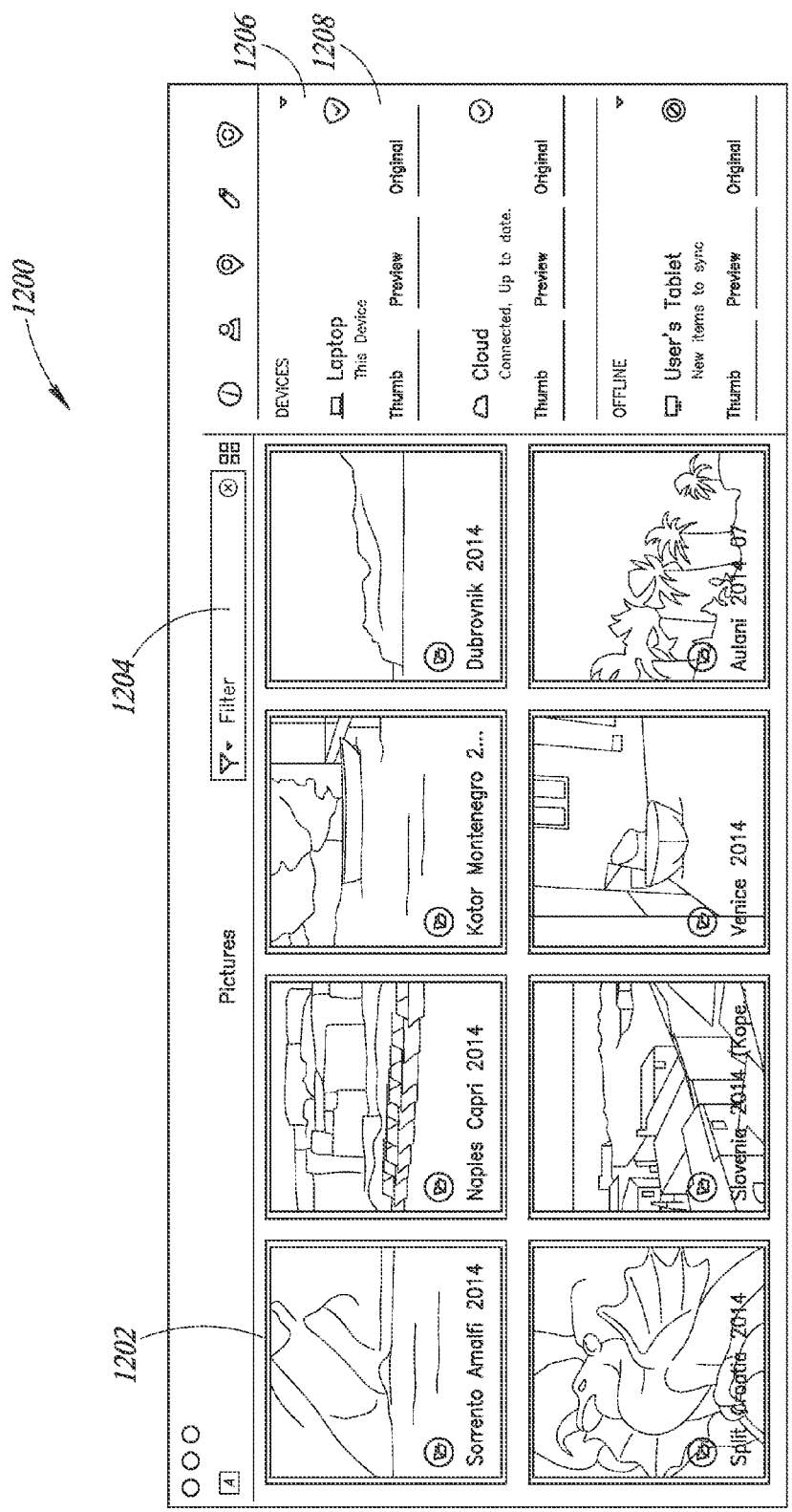
FIG. 12 is a screenshot of a main user interface for an object management system, according to one illustrated implementation.

FIG. 12 is a screenshot of a main user interface 1200 for an object management system, such as the object management systems 100 and 200 of FIGS. 1 and 2, respectively. The user interface 1200 may be viewable by the user on a display of any of the user processor-based devices, such as the laptop computer D3, tablet computer D1 or smartphone D2. The user interface 1200 may be provided via a client application executing on the user processor-based device and/or may be provided through a Web browser executing on the processor-based device, for example.

The user interface 1200 includes an objects window 1202 which displays a plurality of folders of pictures. The folders and/or pictures which are displayed in the objects window 1202 may be selectively configured by choosing one or more filters via a filter selection interface 1204.

The user interface 1200 also includes a visual representation of the ODL system which allows the user to view the status of 'needs' and 'has' for all forms of media objects across all of the user's processor-based devices. The user interface 1200 also allows the user to set or clear device, container, or media specific ODL settings, including conditional ODL settings, for any of the user's processor-based devices.

In the illustrated implementation, the user interface 1200 includes a devices window 1206 which shows each of the user's devices. In this example, the devices window 1206 shows the user's laptop computer D3, the user's tablet computer D1, and the cloud or provider system D5. Below each device is an indication 1208 regarding whether the device needs each form (original, preview, thumbnail) of the selected picture or container objects, and also an indication regarding whether the device currently has each form of the picture objects. If no selection is present in 1202, the ODL settings are global to all content for a given device. The user may selectively adjust the replication policy settings for each of the user processor-based devices using the devices window 1206.

Figure 13:
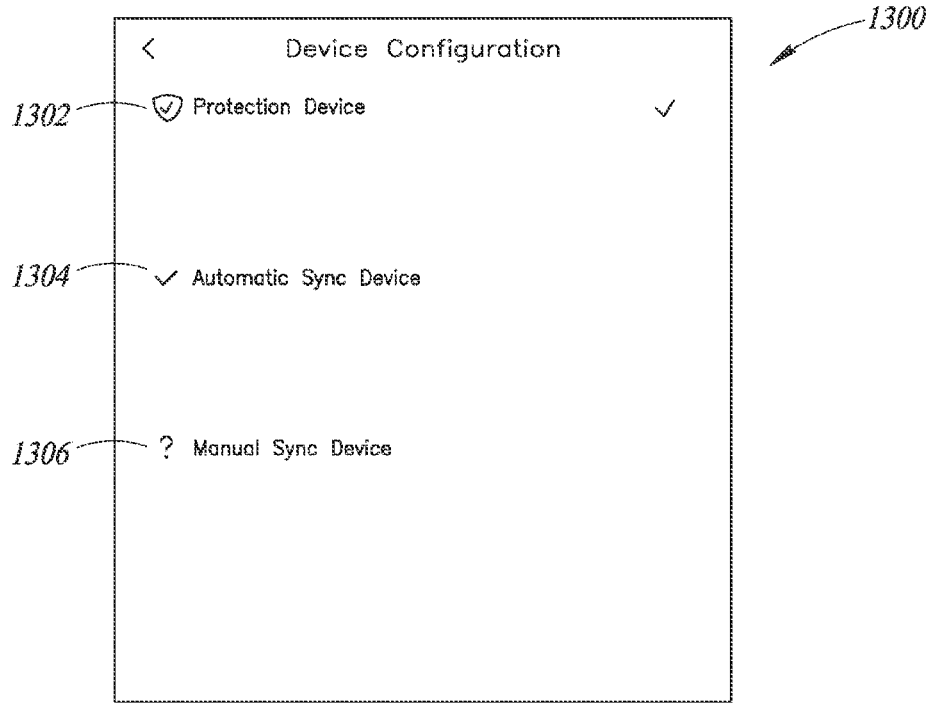
FIG. 13 is a screenshot of a device configuration user interface for an object management system, according to one illustrated implementation.

FIG. 13 is a screenshot of a device configuration user interface 1300. In this example, the user may select whether a device is a protection device 1302, an automatic synchronization device 1304 or a manual synchronization device 1306. If the device is configured as a protection device 1302, the device will automatically replicate and synchronize all original files to the device. If the device is configured as an automatic synchronization device 1304, the device will automatically synchronize previews for all of the user's photos and videos. If the device is configured as a manual synchronization device 1306, the device will only synchronize previews for objects in folders that are chosen by the user.

Figure 14:
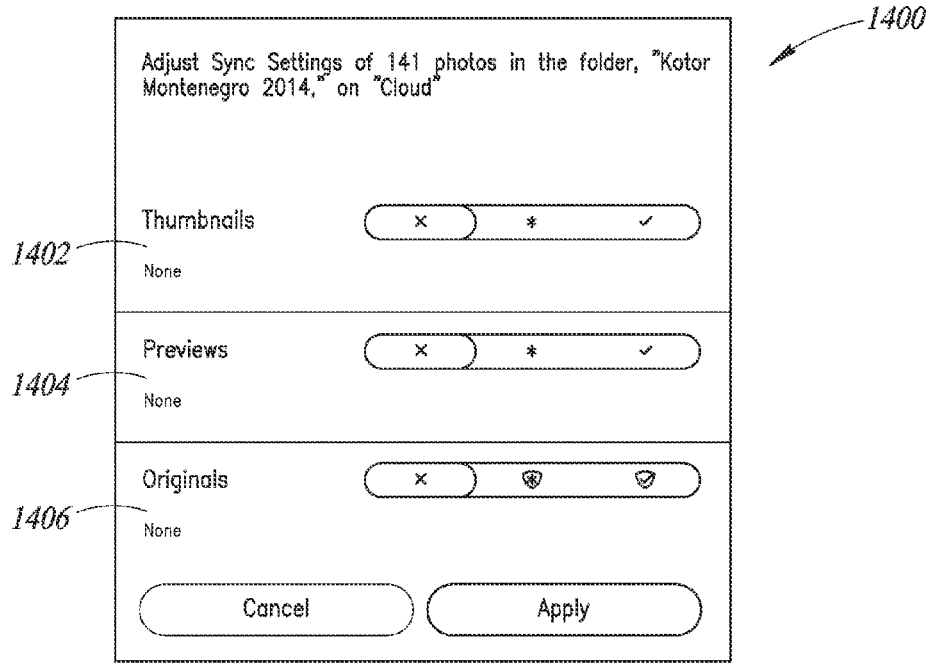
FIG. 14 is a screenshot of a synchronization settings user interface for an object management system, according to one illustrated implementation.

FIG. 14 is a screenshot of a synchronization settings user interface 1400 for a folder named "Kotor Montenegro 2014" stored on the provider system or cloud D5 (see FIG. 1). In the illustrated example, the cloud storage D5 is configured to not replicate or store the thumbnail form 1402, the preview form 1404, or the original form 1406 of objects in the folder. The user may utilize the synchronization setting user interface 1400 to selectively set the replication policy for each of the user processor-based devices.

Figure 15:
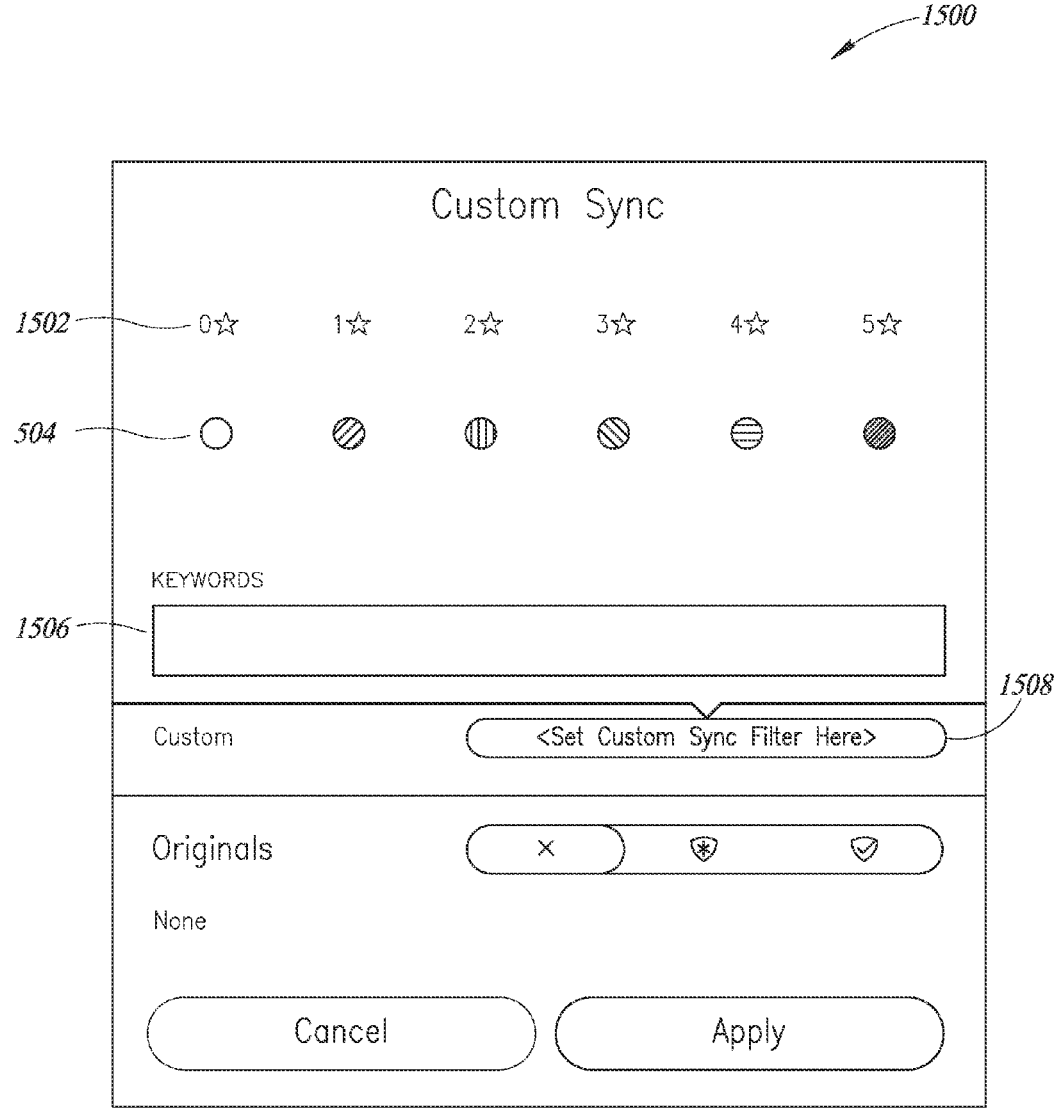
FIG. 15 is a screenshot of a custom synchronization settings user interface for an object management system, according to one illustrated implementation.

FIG. 15 is a screenshot of a custom synchronization settings user interface 1500. In this example, the user may set a device to replicate and synchronize object having a particular star rating 1502, a particular color label 1504, or objects associated with particular keywords 1506. The user interface 1500 may also include a button 1508 which allows the user to set custom synchronization filters according to any number of attributes of the objects. Synchronization settings may apply to individual media, containers, or global device policy settings. If a parent container or device setting changes, the user may be given an option to override any or all contained content ODL settings.

Figure 16:
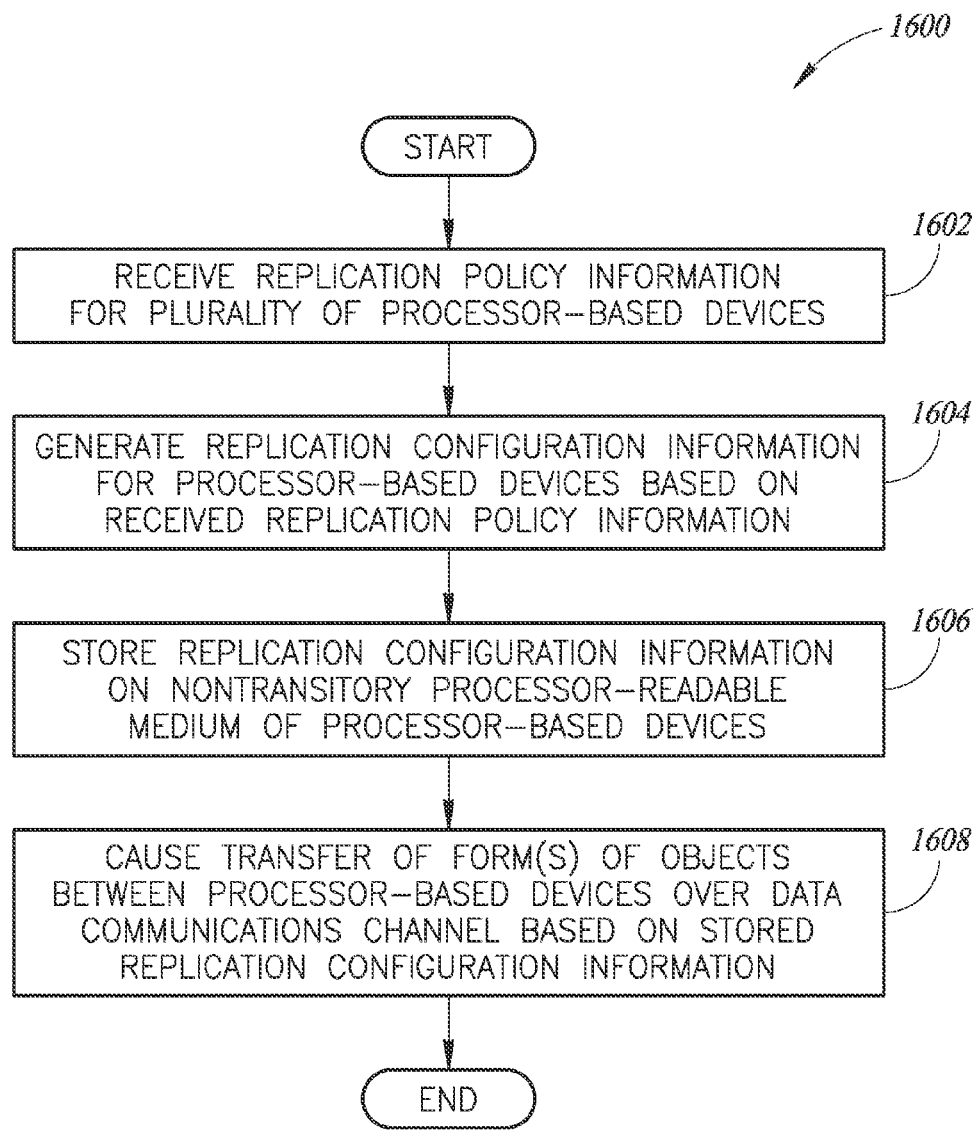
FIG. 16 is a flow diagram for a method of operation of an object management system, according to one illustrated implementation.

FIG. 16 shows a method 1600 of operation of an object management system, such as the object management systems 100 and 200 of FIGS. 1 and 2, respectively. At 1602, at least one processor may receive replication policy information for at least one of the plurality of processor-based devices, for example, via a user interface of one of the processor-based devices, via policy information automatically computed based on container inheritance, and/or via device policy settings where specific user instructions are not provided. In some implementations, the replication policy information may indicate whether at least one of the plurality of processor-based devices associated with a user needs each of a plurality of forms of at least a subset of the plurality of objects. In some implementations, the replication policy information indicates the at least one of the plurality of processor-based devices needs only one form of a plurality of forms of at least a subset of the plurality of objects. In some implementations, at least some of the plurality of objects are logically associated with at least one container (e.g., folder, album, month), and the replication policy information indicates the at least one of the plurality of processor-based devices needs at least one form of each of the plurality of objects logically associated with a particular container.

In some implementations, the at least one processor may determine a physical location of a first processor-based device of the plurality of processor-based devices relative to a physical location of a second processor-based device of the plurality of processor-based devices. The replication policy information for the first processor-based device may indicate the first processor-based device needs at least one form of each object in at least a subset of the plurality of objects unless the at least one form of the respective object is currently stored on the nontransitory processor-readable medium of the second processor-based device physically proximate the first processor-based device.

In some implementations, the replication policy information for a first processor-based device may indicate the first processor-based device needs any form of an object which a second processor-based device needs but does not currently have stored in the nontransitory processor-readable medium of the second processor-based device. In some implementations, the replication policy information may indicate the at least one of the plurality of processor-based devices needs at least one form of an object based at least in part on at least one of: a rating of the object, a range of ratings of the object, a label logically associated with the object, a keyword logically associated with the object, or a container logically associated with the object. In some implementations, the replication policy information for at least one of the plurality of processor-based devices may indicate the at least one of the plurality of processor-based devices needs at least one form of an object based at least in part on a determined source of the object.

In some implementations, the at least one processor may cause a replication policy setting interface to be presented to a user via a user interface of at least one of the plurality of processor-based devices. For example, the at least one processor may cause a replication policy setting interface to be presented which allows the user to modify replication policy information for at least two of the plurality of processor-based devices associated with the user. In some implementations, the replication policy setting interface may provide an indication of replication status for at least two of the plurality of processor-based devices.

At 1604, responsive to receipt of the replication policy information, the at least one processor may generate the replication configuration information for the at least one of the plurality of processor-based devices. The replication configuration information may identify, for each of a plurality of processor-based devices, whether the processor-based device needs one or more forms of each of a plurality of objects, and whether the processor-based device presently has one or more of the forms of each of the plurality of objects stored on a respective nontransitory processor-readable medium of the processor-based device. In some implementations, the at least one processor generates replication configuration information which identifies, for each of the plurality of processor-based devices, whether the processor-based device needs a particular one or more of a plurality of forms of each of the objects, and whether the processor-based device presently has a particular one or more of the plurality of forms of each of the plurality of objects stored on the respective nontransitory processor-readable medium of the processor-based device.

At 1606, the at least one processor stores the replication configuration information on the nontransitory processor-readable medium of each of the plurality of processor-based devices associated with the user so each of the devices have knowledge about the replication configuration of all other devices of the system. For example, as discussed above, the at least one processor may store the replication configuration information as an object device link (ODL) table on a non-transitory processor-readable medium of each of the plurality of processor-based devices. The ODL table may include a plurality of Device-Needs Flags for each form of each of the plurality of objects, wherein each Device-Needs Flag is indicative of whether one of the processor-based devices needs a form of the object. The ODL table may also include a plurality of Device-Has Flags for each form of each of the plurality of objects, wherein each Device-Has Flag is indicative of whether one of the processor-based devices currently has a form of the object stored on the respective nontransitory processor-readable medium of the processor-based device.

At 1608, the at least one processor may cause a transfer of at least one form of at least one of the objects between at least two of the plurality of processor-based devices over a data communications channel based at least in part on the stored replication configuration information. The data communications channel may be a direct channel between two of the plurality of processor-based devices, or an indirect channel that traverses one or more networks and/or one or more intermediate processor-based devices. The at least one processor may also update the Has Flag respective replication configuration information stored on the nontransitory processor-readable medium of each of the respective plurality of processor-based devices responsive to causing the transfer of at least one form of at least one of the objects between at least two of the plurality of processor-based devices over the data communications channel.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, solid state drives, flash memory storage, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for a data storage system to replicate a plurality of objects across a plurality of processor-based devices, the method comprising:
   receiving, by at least one processor, replication configuration information which identifies, for each of the plurality of processor-based devices, whether the processor-based device needs a form of each of the objects, and whether the processor-based device presently has a form of each of the plurality of objects stored on a respective nontransitory processor-readable medium of the processor-based device;

storing, by the at least one processor, the replication configuration information on the nontransitory processor-readable medium of each of the plurality of processor-based devices;

causing, by the at least one processor, a transfer of at least one form of at least one of the objects between at least two of the plurality of processor-based devices over a data communications channel based at least in part on the stored replication configuration information;

determining, by at least one processor of one of the processor-based devices, a need for a first form of an object by the one of the processor-based devices;

determining, by the at least one processor of the one of the processor-based devices, that a second form of the object is currently stored on the nontransitory processor-readable medium of the one of the processor-based devices, the second form of the object different from the first form of the object;

automatically generating, by the at least one processor of the one of the processor-based devices, the first form of the object from the second form of the object; and storing, by the at least one processor of the one of the processor-based devices, the generated first form of the object on the nontransitory processor-readable medium of the one of the processor-based devices.

2. The method of claim 1 wherein storing the replication configuration information comprises storing, by the at least one processor, the replication configuration information as an object device link (ODL) table on a nontransitory processor-readable medium of each of the plurality of processor-based devices, the ODL table comprising a plurality of device-needs flags for each form of each of the plurality of objects, each device-needs flag is indicative of whether one of the processor-based devices needs a form of the object, the ODL table further comprising a plurality of device-has flags for each form of each of the plurality of objects, each device-has flag is indicative of whether one of the processor-based devices currently has a form of the object stored on the respective nontransitory processor-readable medium of the processor-based device.

3. The method of claim 1, further comprising:
updating, by the at least one processor, the respective replication configuration information stored on the nontransitory processor-readable medium of each of the respective plurality of processor-based devices responsive to causing the transfer of at least one form of at least one of the forms of objects between at least two of the plurality of processor-based devices over the data communications channel.

4. The method of claim 1 wherein receiving replication configuration information comprises receiving, by the at least one processor, replication configuration information which identifies, for each of the plurality of processor-based devices, whether the processor-based device needs a particular one or more of a plurality of forms of each of the objects, and whether the processor-based device presently has a particular one or more of the plurality of forms of each of the plurality of objects stored on the respective nontransitory processor-readable medium of the processor-based device.

5. The method of claim 1, further comprising:

receiving, by the at least one processor, replication policy information for at least one of the plurality of processor-based devices;

generating, by the at least one processor, replication configuration information for the at least one of the plurality of processor-based devices based on the received replication policy information; and storing, by the at least one processor, the replication configuration information on the nontransitory processor-readable medium of each of the plurality of processor-based devices.

6. The method of claim 5 wherein receiving replication policy information for at least one of the plurality of processor-based devices comprises receiving replication policy information which indicates the at least one of the plurality of processor-based devices needs each of a plurality of forms of at least a subset of the plurality of objects.

7. The method of claim 5 wherein receiving replication policy information for at least one of the plurality of processor-based devices comprises receiving replication policy information which indicates the at least one of the plurality of processor-based devices needs only one form of a plurality of forms of at least a subset of the plurality of objects.

8. The method of claim 5 wherein at least some of the plurality of objects are logically associated with at least one container, and receiving replication policy information for at least one of the plurality of processor-based devices comprises receiving replication policy information which indicates the at least one of the plurality of processor-based devices needs at least one form of each of the plurality of objects logically associated with a particular container.

9. The method of claim 5 wherein receiving replication policy information for at least one of the plurality of processor-based devices comprises receiving replication policy information which indicates that at least a plurality of the processor-based devices need to have an original form of at least a subset of the plurality of objects.

10. The method of claim 5 wherein receiving replication policy information for at least one of the plurality of processor-based devices comprises receiving replication policy information for a first processor-based device which indicates the first processor-based device needs any form of an object which a second processor-based device needs but does not currently have stored in the nontransitory processor-readable medium of the second processor-based device.

11. The method of claim 5 wherein receiving replication policy information for at least one of the plurality of processor-based devices comprises receiving replication policy information which indicates the at least one of the plurality of processor-based devices needs at least one form of an object based at least in part on at least one of: a rating of the object, a range of ratings of the object, a label logically associated with the object, a keyword logically associated with the object, or a container logically associated with the object.

12. The method of claim 5 wherein receiving replication policy information for at least one of the plurality of processor-based devices comprises receiving replication policy information for at least one of the plurality of processor-based devices which indicates the at least one of the plurality of processor-based devices needs at least one form of an object based at least in part on a property of the object.

13. The method of claim 1 wherein the plurality of objects are logically stored in hierarchical containers, the method further comprising:

automatically generating, by the at least one processor, replication policy information for a child container based on the replication policy information for a parent container of the child container.

14. The method of claim 1, further comprising:
causing, by the at least one processor, a replication policy modification interface to be presented to a user via a user interface of at least one of the plurality of processor-based devices.

15. The method of claim 14 wherein causing a replication policy modification interface to be presented comprises causing a replication policy modification interface to be presented which allows the user to modify replication policy information for at least two of the plurality of processor-based devices.

16. The method of claim 14 wherein causing a replication policy modification interface to be presented comprises causing a replication policy modification interface to be presented which provides an indication of replication status for at least two of the plurality of processor-based devices.

17. The method of claim 1 wherein at least some of the plurality of objects each comprise a photo object, and wherein receiving replication configuration information comprises receiving replication configuration information which identifies, for each of the plurality of processor-based devices, whether the processor-based device needs each of a plurality of forms of each of the photo objects, and whether the processor-based device presently has each of the plurality of forms of each of the photo objects stored on the respective nontransitory processor-readable medium of the processor-based device, and each of the plurality of forms of each of the photo objects differs from each other at least by photo resolution.

18. A data storage system to selectively replicate a plurality of objects across a plurality of processor-based devices, the data storage system comprising:
at least one nontransitory processor-readable medium that stores processor-executable instructions; and
at least one processor communicably coupled to the at least one nontransitory processor-readable medium, the at least one processor:
receives replication configuration information which identifies, for each of the plurality of processor-based devices, whether the processor-based device needs a form of each of the objects, and whether the processor-based device presently has a form of each of the plurality of objects stored on a respective nontransitory processor-readable medium of the processor-based device;
stores the replication configuration information on the nontransitory processor-readable medium of each of the plurality of processor-based devices;
causes a transfer of at least one form of at least one of the objects between at least two of the plurality of processor-based devices over a data communications channel based at least in part on the stored replication configuration information;
determines a need for a first form of an object by the one of the processor-based devices;
determines that a second form of the object is currently stored on the nontransitory processor-readable medium of the one of the processor-based devices, the second form of the object different from the first form of the object;
automatically generates the first form of the object from the second form of the object; and
stores the generated first form of the object on the nontransitory processor-readable medium of the one of the processor-based devices.

19. The data storage system of claim 18 wherein the at least one processor:
stores the replication configuration information as an object device link (ODL) table on the nontransitory processor-readable medium of each of the plurality of processor-based devices, the ODL table comprising a plurality of device-needs flags for each form of each of the plurality of objects, each device-needs flag is indicative of whether one of the processor-based devices needs a form of the object, the ODL table further comprising a plurality of device-has flags for each form of each of the plurality of objects, each device-has flag is indicative of whether one of the processor-based devices currently has a form of the object stored on the respective nontransitory processor-readable medium of the processor-based device.

20. The data storage system of claim 18 wherein the at least one processor:
updates the respective replication configuration information stored on the nontransitory processor-readable medium of each of the respective plurality of processor-based devices responsive to the causation of the transfer of at least one form of at least one of the objects between at least two of the plurality of processor-based devices over the data communications channel.

21. The data storage system of claim 18 wherein the at least one processor:
receives replication configuration information which identifies, for each of the plurality of processor-based devices, whether the processor-based device needs a particular one or more of a plurality of forms of each of the objects, and whether the processor-based device presently has a particular one or more of the plurality of forms of each of the plurality of objects stored on the respective nontransitory processor-readable medium of the processor-based device.

22. The data storage system of claim 18 wherein the at least one processor:
receives replication policy information for at least one of the plurality of processor-based devices;
generates replication configuration information for the at least one of the plurality of processor-based devices based on the received replication policy information; and
stores the replication configuration information on the nontransitory processor-readable medium of each of the plurality of processor-based devices.

23. The data storage system of claim 22 wherein the at least one processor:
receives replication policy information which indicates the at least one of the plurality of processor-based devices needs each of a plurality of forms of at least a subset of the plurality of objects.

24. The data storage system of claim 22 wherein the at least one processor:
determines a physical location of a first processor-based device of the plurality of processor-based devices relative to a physical location of a second processor-based device of the plurality of processor-based devices; and
receives replication policy information for the first processor-based device which indicates the first processor-based device needs at least one form of each object in at least a subset of the plurality of objects unless the at least one form of the respective object is currently stored on the nontransitory processor-readable medium of the second processor-based device physically proximate the first processor-based device.

25. The data storage system of claim 22 wherein the at least one processor:

receives replication policy information for a first processor-based device which indicates the first processor-based device needs any form of an object which a second processor-based device needs but does not currently have stored in the nontransitory processor-readable medium of the second processor-based device.

26. The data storage system of claim 22 wherein the at least one processor:

receives replication policy information which indicates the at least one of the plurality of processor-based devices needs at least one form of an object based at least in part on at least one of: a rating of the object, a range of ratings of the object, a label logically associated with the object, a keyword logically associated with the object, or a container logically associated with the object.

27. The data storage system of claim 18 wherein the plurality of objects are logically stored in hierarchical containers, and the at least one processor:

automatically generates replication policy information for a child container based on the replication policy information for a parent container of the child container.

28. The data storage system of claim 18 wherein the at least one processor:

causes a replication policy setting interface to be presented to a user via a user interface of at least one of the plurality of processor-based devices.

\* \* \* \* \*